US006501963B1

(12) United States Patent
Balents et al.

(10) Patent No.: US 6,501,963 B1
(45) Date of Patent: Dec. 31, 2002

(54) DESIGN, FABRICATION AND OPERATION OF ANTENNAS FOR DIFFUSIVE ENVIRONMENTS

(75) Inventors: Leon Michael Balents, Santa Barbara, CA (US); Harold Urey Baranger, Durham, NC (US); Aris Leonidas Moustakas, New York City, NY (US); Anirvan Mayukh Sengupta, Warren, NJ (US); Steven Herbert Simon, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/378,362

(22) Filed: Aug. 20, 1999

Related U.S. Application Data

(60) Provisional application No. 60/125,162, filed on Mar. 19, 1999.

(51) Int. Cl.[7] .................................................. H04B 1/38

(52) U.S. Cl. .......................................... 455/562; 455/63

(58) Field of Search ............................ 455/562, 69, 63, 455/561, 67.1; 342/359, 368

(56) References Cited

U.S. PATENT DOCUMENTS 5,926,768 A * 7/1999 Lewiner et al. ............. 455/562
6,073,032 A * 7/2000 Keskitalo et al. ........... 455/561
6,091,788 A * 7/2000 Keskitalo et al. ........... 375/347
6,212,406 B1 * 4/2001 Keskitalo et al. ........... 455/562

OTHER PUBLICATIONS

D. Ullmo & H.U. Baranger, "Wireless Propagation in Buildings: A Statistical Scattering Approach," *IEEE Trans. on Vehicular Technology*, vol. 48, No. 3, May 1999, pp. 947–955.

G.J.Foschini & M.J. Gans, "On Limits of Wireless Communications in a Fading Environment When Using Multiple Antennas," *Wireless Personal Communications*, Kluwer Academic Publishers, No. 6, pp 311–335, 1998.

* cited by examiner

*Primary Examiner*—Nguyen T. Vo
*Assistant Examiner*—Nghi H. Ly
(74) *Attorney, Agent, or Firm*—DeMont & Breyer, LLC

(57) ABSTRACT

A method of designing, fabricating and operating antennas is disclosed that considers the diffusive nature of the environment in which the antennas are to operate. Furthermore, the antennas can be designed, fabricated and operated so as to provide the optimal channel capacity possible given the diffusive nature of the environment in which they are to operate. The illustrative embodiment of the present invention comprises: describing an environment; describing a candidate antenna; determining a performance characteristic based on the candidate antenna with respect to the environment; and fabricating a first antenna in accordance with the candidate antenna.

18 Claims, 2 Drawing Sheets

DESIGN, FABRICATION AND OPERATION OF ANTENNAS FOR DIFFUSIVE ENVIRONMENTS

REFERENCE TO RELATED APPLICATIONS

This application claims the benefit of U.S. Provisional Application No. 60/125,162, filed Mar. 19, 1999, which is also incorporated by reference.

FIELD OF THE INVENTION

The present invention relates to the design, fabrication and operation of antennas in general, and, more particularly, to a technique for designing, fabricating and operating antennas that considers the diffusive nature of the environment in which the antennas are to operate.

BACKGROUND OF THE INVENTION

Although it is not usually difficult to design a workable antenna, it is notoriously difficult to design a good antenna. And while the truthfulness of this statement may be clear for the radio amateur, it is also true for the professional antenna designer who has experience, a state-of-the-art laboratory, and a modern computer with good antenna modeling software.

One of the reasons that a good antenna is difficult to design is that the elements of the antenna interact in a complex and nonlinear manner. Recently, advances in antenna modeling software have made this consideration easier. Another reason is that the objects in the environment in which the antenna operates might scatter the transmitted signal.

FIG. 1 depicts an illustrative terrestrial environment that comprises: transmitting antenna 101, receiving antenna 102, forest 111, building 112, building 113 and boat 114. As a signal is transmitted from transmitting antenna 101 to receiving antenna 102, the signal is likely to be scattered by objects in the environment that are near and between the transmitting antenna and the receiving antenna. A good antenna design considers the scattering of the transmitted signal.

In the prior art, the multipath character of the environment has not, in general, been considered in designing antennas. Rather, designers have usually made the simplifying assumption that the antennas operate in "free space." FIG. 2 depicts a transmitting antenna and a receiving antenna in free space. When antennas are operating in free space, it is assumed that the transmitted signal radiates without scattering from the transmitting antenna to the receiving antenna. This assumption is perhaps reasonable for terrestrial microwave and satellites, but is untenable for many terrestrial applications (e.g., cities, etc.). The result is that antennas designed and fabricated to operate in free space provide poor performance when operating in diffusive environments. Therefore, the need exists for a technique for designing and fabricating antennas that considers the multipath character of the environment in which the antennas are to operate.

SUMMARY OF THE INVENTION

Some embodiments of the present invention are able to design, fabricate and operate antennas without some of the costs and disadvantages of techniques in the prior art. In particular, the illustrative embodiment of the present invention not only considers the multipath character of the environment in which the antennas will operate, but also takes advantage of the scattering to make better antennas.

Furthermore, the illustrative embodiment of the present invention can design, fabricate and operate antennas that provide optimal channel capacity by taking advantage of the multipath character of the environment in which the antennas operate.

The illustrative embodiment of the present invention models the multipath character of the environment using diffusive models and uses an iterative approach to predict the performance of candidate antenna designs in that environment and to suggest improvements in the design until the predicted performance reaches an optimal or otherwise acceptable level.

The illustrative embodiment of the present invention comprises: describing an environment; describing a candidate antenna; determining a performance characteristic based on the candidate antenna with respect to the environment; and fabricating a first antenna in accordance with the candidate antenna.

DETAILED DESCRIPTION

Figure 1:
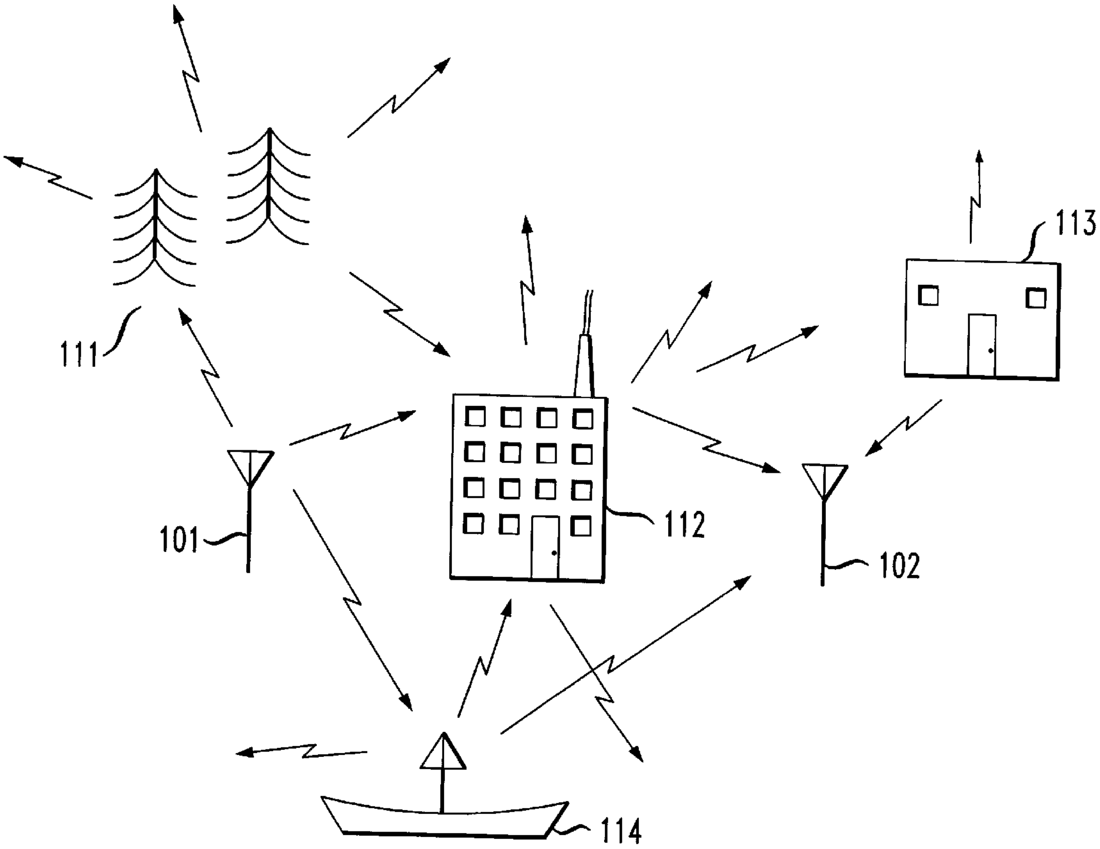
FIG. 1 PRIOR ART
FIG. 1 depicts an illustration of two antennas in a multipath environment.
Figure 2:
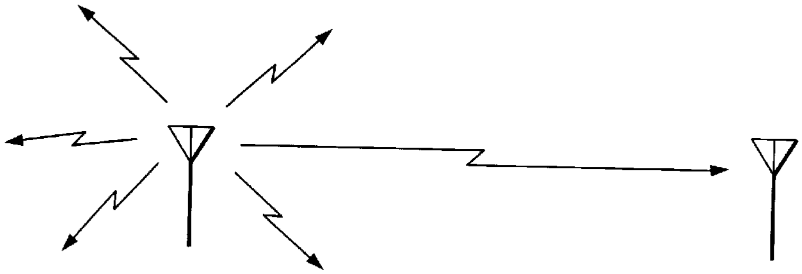
FIG. 2 PRIOR ART
FIG. 2 depicts an illustration of two antennas in a free space.
Figure 3:
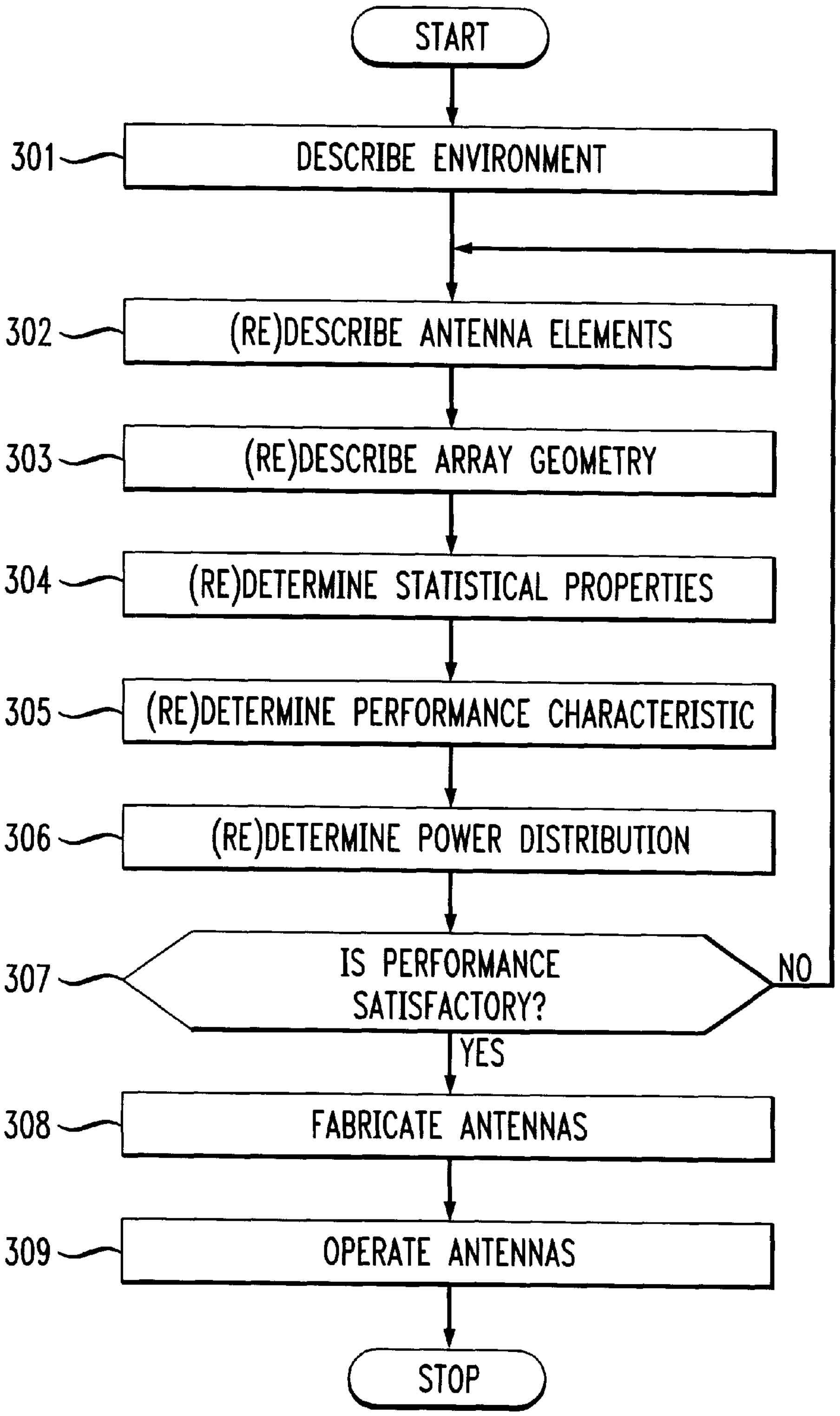
FIG. 3 depicts a flowchart of the illustrative embodiment of the present invention.

FIG. 3 depicts a flowchart of the illustrative embodiment of the present invention. First, the illustrative embodiment is described in its generalized form as it is applied to any type of antennas in any type of environment. Thereafter, the illustrative embodiment is described as it is applied to two specific examples, which are chosen to aid in an understanding of the present invention.

I. Generalized Technique

The illustrative embodiment of the present invention comprises four phases. In Phase 1 (step 301), the environment in which the antennas are to function is described. In Phase 2 (steps 302 and 303), the candidate antennas are described in terms of those parameters that if changed might affect the performance of the antennas. In Phase 3 (steps 304, 305 and 306), the performance of the candidate antennas are predicted with respect to the environment described in Phase 1. If, after Phase 3, the predicted performance is unsatisfactory, the illustrative embodiment successively iterates through Phases 2 and 3, each time varying one or more parameters of the candidate antennas, until the performance of the candidate antennas is optimal or satisfactory. In Phase 4 (step 308), the antennas are fabricated, deployed and operated in accordance with the parameters that yielded the satisfactory performance prediction.

The illustrative embodiment of the present invention predicts the performance of the antennas for a signal of interest, which by definition comprises just a single frequency defined in terms of its wavelength, $\lambda$. Antennas designed in accordance with the present invention can easily transmit and receive more than one frequency at a time, but the illustrative embodiment of the present invention only considers a signal of interest comprising one frequency at a time. It will be clear, however, to those skilled in the art how to make and use embodiments of the present invention that consider a signal of interest comprising a plurality of frequencies.

Because the illustrative embodiment of the present invention considers the nature of the environment surrounding the antennas in designing the antennas, at step 301, those aspects of the environment that might affect the propagation of the signal of interest from the transmitting antenna to the receiving antenna are described. In particular, those aspects of the environment that might affect the propagation of the signal of interest are described in terms of their properties or geometry or both.

A specific environment (e.g., Bob's Warehouse at 42nd Street and 11th Avenue, Sherwood Forest, downtown St. Louis, etc.) might be described or a nonspecific environment (e.g., a typical warehouse, a typical deciduous forest, a typical city, etc.) or a combination might be described.

The properties and geometric factors about the environment that might be described include:

Is the environment diffusive? In other words, is the mean free path of the environment much greater than the wavelength of the transmitted signal? Is all of the environment diffusive or only some portions?

If only some portions of the environment are diffusive, where are the antennas with respect to the diffusive portions? Are both the transmitting and receiving antennas deep within a diffusive portion (e.g., both within a building, one within a building and the other without, both within different buildings, etc.) or is one antenna inside a diffusive portion and the other outside the diffusive portion (e.g., the transmitting antenna is high on a tower where there is no clutter and the receiving antenna is on the ground floor of a building in Manhattan where there is lots of clutter, etc.).

Is the scattering of the transmitted signal isotropic? For example, the scattering within a building with walls at 90 degree angles is not isotropic because the scattering is not random.

Are there considerable or negligible signal losses due to absorption in the environment?

Are the signal losses due to absorption in the environment isotropic?

The way that these environmental factors can be described in a useful (i.e., quantitative) form will be described below. It will be clear to those skilled in the art what other environmental properties and geometric factors that affect the propagation of the signal of interest might be considered.

In general, there is a trade-off between considering many properties and geometric factors and ignoring the properties and geometric factors. The consideration of many properties and geometric factors of the environment will tend to:

1. increase the performance of the resulting antennas;
2. increase the computational complexity of the process for designing the antennas; and
3. decrease the interval during which the parameters chosen in accordance with the illustrative embodiment are accurate (because the environment may change over time).

Therefore, it will clear to those skilled in the art that, in general, the environment in which the antennas are to operate should probably not always be described in infinitesimal detail, but that certain simplifying assumptions should often be made. In many cases, the intentional and careful omission of some details will not affect the ability of the illustrative embodiment to design the antennas.

At step 302, the antenna elements in both the transmitting antenna and the receiving antenna are described in terms of their properties or geometric factors or both. Advantageously, the properties and geometric factors of each antenna element are described in terms of parameters that, if changed, might improve the performance of the resulting antennas.

The properties and geometric factors about the antenna elements that might be described include:

Are the antenna elements directional or omnidirectional?

What is the size of the antenna element as compared to the wavelength of the signal of interest?

What is the three-dimensional shape of the antenna element?

Does the antenna element distort the near-field signal significantly?

How much does the antenna element feed influence the signal characteristics?

The way that the properties and geometric factors of the antenna elements factors can be described in a useful (i.e., quantitative) form will be described below. It will be clear to those skilled in the art what other properties and geometric factors that affect the propagation of the signal of interest might be considered.

As in step 301, there is a trade-off between considering many properties and geometric factors and ignoring the properties and geometric factors. The consideration of many properties and geometric factors of the antennas will tend to:

1. increase the performance of the resulting antennas;
2. increase the computational complexity of the process for designing the antennas; and
3. decrease the interval during which the parameters chosen in accordance with the illustrative embodiment are accurate (because the environment may change over time).

Therefore, it will clear to those skilled in the art that, in general, the antenna elements should probably not always be described in infinitesimal detail, but that certain simplifying assumptions should often be made. In many cases, the intentional and careful omission of some details will not affect the ability of the illustrative embodiment to design the antennas.

At step 303, if either the transmitting antenna or the receiving antenna comprises a plurality of elements (i.e., is a compound antenna), the compound nature of the antennas are described in terms of their properties or geometry or both. Furthermore, the position of the antennas with respect to the environment and with respect to each other is described. Advantageously, the properties and geometry of the compound nature of each antenna are described in terms of parameters that, if changed, might improve the performance of the resulting antennas.

The properties and geometric factors about the compound nature of the antennas that might be described include:

How many antenna elements are in the transmitting antenna? How many antenna elements are in the receiving antenna? For the purposes of this specification, the number of antenna elements in the transmitting antenna is represented by $n_T$, the number of antenna elements in the receiving antenna is represented by $n_R$, and $m=\text{minimum}(n_T, n_R)$.

What is the geometry of the antenna elements in the transmitting antenna and in the receiving antenna? Are the antenna elements in a line? Or arranged in a two- or three-dimensional array?

Is the mutual coupling between the antenna elements to be considered or ignored?

What is the distance between the antenna elements in the transmitting antenna? What is the distance between the antenna elements in the receiving antenna? For the purposes of this specification, the distance between two antenna elements, antenna element a and antenna element b, in a single antenna is defined as $r_{ab}$.

How are the antenna arrays pointed with respect to the environment? Up? Down? Sideways?

Is the transmitted signal power at the various transmitting antenna elements constrained or unconstrained? If it is unconstrained, the illustrative embodiment can determine the optimal distribution of power among the various transmitting antenna elements. If it is constrained, is the power evenly or unevenly distributed among the various transmitting antenna elements. For the purposes of this specification, the distribution of power among the $n_T$ transmitter elements for the signal of interest is described by the transmitter power correlation matrix, M, where the trace of M equals $n_T$, the matrix element $M_{ij}=\langle x_i(t)x_j^*(t)\rangle$, $x_i(t)$ is the normalized instantaneous signal (electric field) transmitted by transmitter element i, for i=1 to $n_T$, $x_j^*(t)$ is the complex conjugate of the normalized instantaneous signal (electric field) transmitted by transmitter element j, for j=1 to $n_T$, and $\langle X\rangle$ is the time average of X at the frequency of interest. If the transmitter power correlation matrix, M, is unconstrained, the illustrative embodiment of the present invention will compute the optimal transmitter power correlation matrix, M, in step 306.

What is the total average power at the receiving antenna from all of the transmitter elements? For the purposes of this specification, the total average power at the receiving antenna from all of the transmitting antenna elements is defined as S.

What is the noise at each receiving antenna element? In the illustrative embodiment of the present invention, the noise at each receiving antenna element is assumed to be Gaussian, independent of and identically distributed with respect to the noise at the other receiving antenna elements and its average power is assumed to be N. It will be clear to those skilled in the art how to make and use embodiments of the present invention in which the noise is not independent or identically distributed.

What is the signal to noise ratio at each receiving antenna element? For the purposes of this specification the signal to noise ratio at each receiving antenna element defined as $$\rho = \frac{S}{N}.$$

As in steps 301 and 302, the consideration of many properties and geometric factors of the compound nature of the antennas will tend to:

1. increase the performance of the resulting antennas;
2. increase the computational complexity of the process for designing the antennas; and
3. decrease the interval during which the parameters chosen in accordance with the illustrative embodiment are accurate (because the environment may change over time).

Therefore, it will clear to those skilled in the art that, in general, the compound nature of the antennas should probably not always be described in infinitesimal detail, but that certain simplifying assumptions should often be made. In many cases, the intentional and careful omission of some details will not affect the ability of the illustrative embodiment to design the antennas.

At step 304, the process of predicting the performance of the antennas described in steps 302 and 303 begins. First, certain statistical properties (e.g., the covariance, etc.) of the signal between the transmitting antenna and the receiving antenna are determined. The signal is described by G, an $n_T$ by $n_R$ matrix in which each matrix element $G_{i\alpha}$ is the signal at receiving antenna element $\alpha$ transmitted from transmitting antenna element i. G is a random matrix with 0 average and its covariance K is defined in terms of G as $K_{ij\alpha\beta}=\overline{G_{i\alpha}G_{j\beta}^*}$ where $G_{j\beta}^*$ is the complex conjugate of the matrix element $G_{j\beta}$ of G;

The overbar indicates an average over the multipath environment (disorder);

K is a four-dimensional matrix of size $n_T$ by $n_T$ by $n_R$ by $n_R$, comprising of elements $K_{ij\alpha\beta}$;

for $\alpha$=1 to $n_R$ and $\beta$=1 to $n_R$; and for i=1 to $n_T$ and j=1 to $n_T$.

It will be clear to those skilled in the art how to make and use embodiments of the present invention where G has a non-zero average. In general:

$$K_{ij\alpha\beta} = \int d\hat{k} \int d\hat{k}' \, T_{ij}(\hat{k}) \frac{S(\hat{k}, \hat{k}')}{n_T} R_{\alpha\beta}(\hat{k}') \tag{1}$$

where:

$s(\hat{k},\hat{k}')$ is the power received at the receiving antenna from direction $\hat{k}'$ that is transmitted by the transmitting antenna in the direction $\hat{k}$, and $S=\int d\hat{k}\int d\hat{k}S(\hat{k},\hat{k}')$;

$T(\hat{k})$ is an $n_T$ by $n_T$ matrix, called the transmitter correlation matrix, in which the matrix element $T_{ij}$ ($\hat{k}$ is the correlation of the signal transmitted from transmitting antenna element i in the direction $\hat{k}$ with respect to the signal transmitted from transmitting antenna element j in the same direction, and is defined as $$T_{ij}(\hat{k}) = \sum_{\hat{e}} w^T(\hat{k}, \hat{e})\chi_i^T(\hat{k}, \hat{e})\chi_j^{T*}(\hat{k}, \hat{e})$$

where:

$\chi_i^T(\hat{k},\hat{e})$ is the response of transmitting antenna element i to an outgoing plane wave with direction $\hat{k}$ and polarization $\hat{e}$;

$\chi_j^T(\hat{k},\hat{e})$ is the complex conjugate of the response of transmitting antenna element j to an outgoing plane wave with direction $\hat{k}$ and polarization $\hat{e}$, $w^T(\hat{k},\hat{e})$ is a weight function that gives the incident power leaving in direction $\hat{k}$ and polarization $\hat{e}$ (where the overall scale of $w^T(\hat{k},\hat{e})$ is chosen so that the trace of matrix T equals $n_T$); and $$\sum_{\hat{e}}$$

is the normalized sum over all polarizations;

$R(\hat{k}')$ is an $n_R$ by $n_R$ matrix, called the receiver correlation matrix, in which the matrix element $R_{\alpha\beta}(\hat{k}')$ is the correlation of the signal received from receiving antenna element $\alpha$ from the direction $\hat{k}'$ with respect to the signal received from receiving antenna element $\beta$ from the same direction, and is defined as $$R_{\alpha\beta}(\hat{k}) = \sum_{\hat{e}} w^R(\hat{k}, \hat{e})\chi_\alpha^R(\hat{k}, \hat{e})\chi_\beta^{R^*}(\hat{k}, \hat{e})$$

where:

$\chi_\alpha^R(\hat{k},\hat{e})$ is the response of receiving antenna element $\alpha$ to an incoming plane wave with direction $\hat{k}$ and polarization $\hat{e}$, $\chi_\beta^{R^*}(\hat{k},\hat{e})$ is the complex conjugate of the response of receiving antenna element $\beta$ to an incoming plane wave with direction $\hat{k}$ and polarization $\hat{e}$, $w^R(\hat{k},\hat{e})$ is a weight function that gives the incident power arriving from direction $\hat{k}$ and polarization $\hat{e}$ (where the overall scale of $w^R(\hat{k},\hat{e})$ is chosen so that the trace of matrix R equals $n_R$); and $$\sum_{\hat{e}}$$

is the normalized sum over all polarizations;

$\int d\hat{k}$ is the integral over all directions $\hat{k}$, normalized such that $\int d\hat{k}=1$; and $\int d\hat{k}'$ is the integral over all directions $\hat{k}'$, normalized such that $\int d\hat{k}'=1$.

For isotropically diffusive environments, equation (1) becomes:

$$K_{ij\alpha\beta} = R_{\alpha\beta}\frac{S}{n_T}T_{ij} \tag{2}$$

where the matrix element $R_{\alpha\beta}$ is:

$$R_{\alpha\beta}=\int d\hat{k}R_{\alpha\beta}(\hat{k}) \tag{3}$$

where $\int d\hat{k}$ is the integral over all directions, normalized such that $\int d\hat{k}=1$. The matrix element $T_{ij}$ is:

$$T_{ij}=\int d\hat{k}T_{ij}(\hat{k}) \tag{4}$$

where $\int d\hat{k}$ is the integral over all directions, normalized such that $\int d\hat{k}=1$.

At the end of step 304, the covariance, K, or equivalently $T(\hat{k})$, $R(\hat{k})$ and $S(\hat{k},\hat{k}')$, have advantageously been determined.

Advantageously, the performance characteristic is measured in terms of the channel capacity, C. In general, C is found from K— or equivalently $T(\hat{k})$, $R(\hat{k})$ and $S(\hat{k},\hat{k}')$—M, and the average of G. Here we will assume that G has 0 average. It will be clear to those skilled in the art how to make and use embodiments of the present invention where G has a non-zero average. It will be clear to those skilled in the art how to determine other performance characteristics for the signal of interest between the receiving antenna and the transmitting antenna is determined.

In the illustrative embodiment, we chose G to be known to the receiving antenna but not to the transmitting antenna. This is accomplished, for example, by having the transmitting antenna sending training sequences, periodically or sporadically, to the receiving antenna. It will be clear to those skilled in the art how to generalize this to other cases.

To reduce the computational complexity of the illustrative embodiment, there are advantageously two methods that can be used to compute the channel capacity, C, and the transmitter power correlation matrix, M. The first method is advantageously used when m is large and its accuracy is asymptotically correct as $m \to \infty$. When m is large, certain simplifying assumptions can be made that do not greatly affect the determined value of C.

The second method is advantageously used when m is small and uses Monte Carlo simulation, which is well known to those skilled in the art. In accordance with the second method, the accuracy of the determined value of C increases asymptotically with the number of Monte Carlo trials applied. The first method and the second method shall each be described in turn.

1. The First Method For Computing C and M

In general, for large m, the channel capacity, C, is found from:

$$C = \frac{1}{\ln 2}\left(Tr\left\{\ln\left[I_{n_T} + \frac{1}{N}\int d\hat{k}\int d\hat{k}' T(\hat{k})MS(\hat{k}, \hat{k}')Q(\hat{k}')\right]\right\}\right) + \frac{1}{\ln 2}\left(Tr\left\{\ln\left[I_{n_R} + \frac{1}{N}\int d\hat{k}P(\hat{k})R(\hat{k})\right]\right\} - m\int d\hat{k}Q(\hat{k})P(\hat{k})\right) \tag{5}$$

where:

M is the transmitter power correlation matrix as defined above; and $Q(\hat{k})$ and $P(\hat{k})$ are scalars that can be found from:

$$P(\hat{k}) = \frac{1}{m}Tr\left\{\frac{1}{N}\int d\hat{k}' S(\hat{k}', \hat{k})T(\hat{k}')M\left[I_{n_T} + \frac{1}{N}\int d\hat{k}''\int d\hat{k}' T(\hat{k}'')MS(\hat{k}'', \hat{k}')Q(\hat{k}')\right]^{-1}\right\} \tag{6}$$

$$Q(\hat{k}) = \frac{1}{m}Tr\left\{R(\hat{k})\left[I_{n_R} + \int d\hat{k}' P(\hat{k}')R(\hat{k}')\right]^{-1}\right. \tag{7}$$

For ease of computation, it may be convenient to use an alternate basis, such as spherical harmonics, in place of direction $\hat{k}$ and polarization $\hat{e}$. It will be clear to those skilled in the art that other choices of bases can be made without departing from the present invention At step 305, a performance characteristic for the signal of interest between the receiving antenna and the transmitting antenna is determined, and, if the transmitter power correlation matrix, M, is constrained, at step 306, the value of M that optimizes the performance characteristic is determined.

For isotropically diffusive environments, equations (5), (6) and (7) become greatly simplified. In that case, the channel capacity, C, is found from:

$$C = \frac{1}{\ln 2}\left[-mPQ + Tr\ln(I_{n_T} + \rho QTM) + \sum_{a=1}^{n_R}\ln(1 + PR_a)\right] \tag{8}$$

where:

$R_\alpha$ is the αth eigenvalue of matrix R;

$$P = \frac{1}{m} Tr\rho \frac{TM}{I_{n_T} + \rho QTM} \tag{9}$$

$$Q = \frac{1}{m} \sum_{a=1}^{n_R} \frac{R_a}{1 + PR_a} \tag{10}$$

At step 306, the transmitted power correlation matrix Mis determined. If the transmitter power correlation matrix, M, is constrained to a predetermined and fixed value, then equations (9) and (10) are solved, simultaneously, and resulting values for P and Q are plugged into equation (8).

If the transmitter power correlation matrix, M, is unconstrained, then the eigenvalues of M that yield the optimal value of C can be determined by:

$$M_i = \left(\frac{1}{\Lambda} - \frac{1}{\rho QT_i}\right) \cdot \Theta\left(\frac{1}{\Lambda} - \frac{1}{\rho QT_i}\right) \tag{11}$$

where $T_i$ is the ith eigenvalue of matrix T;

$\Theta(x)=0$ if $x<0$ and $\Theta(x)=x$ if $x \geqq 0$; and

Λ is determined together with P and Q from equations (9), (10) and equation (11)

$$\sum_{i=1}^{n_T} M_i = n_T \tag{12}$$

In the case of unconstrained M, equation (9) simplifies to become:

$$PQ = \frac{n_T}{m} \Lambda \tag{9a}$$

M can then be found from the eigenvalues of M and the unitary matrix V of the eigenvectors of the matrix T, which is defined by:

$$\begin{bmatrix} T_1 & 0 & 0 \\ 0 & \ddots & 0 \\ 0 & 0 & T_{n_r} \end{bmatrix} = V^+ \cdot T \cdot V \tag{13}$$

where $V^+$ is the Hermitian conjugate of V;

$$M = V \begin{bmatrix} M_1 & 0 & 0 \\ 0 & \ddots & 0 \\ 0 & 0 & M_{n_T} \end{bmatrix} V^+ \tag{14}$$

2. The Second Method For Computing C and M

At step 305, for small m, the channel capacity, C, is found from:

$$C = Tr\left\{\log_2\left(I_{n_T} + \frac{1}{N} G^+ GM\right)\right\} \tag{15}$$

where G is a Gaussian random matrix with 0 average and its covariance K is defined in terms of G as $K_{ij\alpha\beta}=\overline{G_{i\alpha}G_{j\beta}^*}$ The value of C is found by generating many random values for G, in accordance with well-known Monte Carlo techniques. It will be clear to those skilled in the art how to make and use embodiments of the present invention where G has a non-zero average.

At step 306, the transmitted power correlation matrix Mis determined as part of step 305 by varying the values for M until a satisfactory or optimal value of C is found.

At step 307, the value of C from step 305 is correlated with the parameters defined in steps 302 and 303, and the decision is made whether the value of C is satisfactory. If C is satisfactory, then control proceeds to step 308; otherwise steps 302 through 306 are iteratively repeated until an optimal or satisfactory value for C is found.

At step 308, the antennas are fabricated in accordance with the parameters defined in steps 302 and 303 that correspond to the optimal or satisfactory value for C. It will be clear to those skilled in the art how to fabricate the antennas in accordance with the parameters defined in steps 302 and 303.

At step 309, the antennas are operated in accordance with the transmitter power correlation matrix, M,computed above. It will be clear to those skilled in the art how to operate the antennas in accordance with the transmitter power correlation matrix, M.

II. The First Example

The first example is a very simple and idealized example that involves the design and fabrication of two array antennas that are both within a uniformly and isotropically diffusive environment with a mean free path that is much larger than the wavelength of the signal of interest. The wavelength of the signal of interest is λ=15 cm. Both the receiving antenna and the transmitting antenna comprise 100 (i.e., $n_T=n_R=100$) antennas in a line, which transmit and receive omnidirectionally. The signal to noise ratio, ρ, is 100. Furthermore, the environment is assumed to have no losses due to absorption, no parasitic affects of the antennas are considered, and there is no mutual coupling between the antenna elements. The distance between the individual antenna elements in both the transmitting antenna and the receiving antenna is represented by a and is the only parameter of the antennas that has been left to be determined by the illustrative embodiment.

Because we have assumed that the antenna elements are point antennas (i.e., the antennas are affected by all polarizations of the electric field at one point), equations (3) and (4) simplify to:

$$R_{\alpha\beta} = \frac{\sin\left(\frac{2\pi}{\lambda} r_{\alpha\beta}\right)}{\left(\frac{2\pi}{\lambda} r_{\alpha\beta}\right)} \tag{17}$$

$$T_{ij} = \frac{\sin\left(\frac{2\pi}{\lambda} r_{ij}\right)}{\left(\frac{2\pi}{\lambda} r_{ij}\right)} \tag{18}$$

Thereafter, the eigenvalues of R and T can be computed in well-known fashion, and C, P, Q and Λ can be computed using equations (10), (11), (12) and (13) to yield (as a function of α):

TABLE 1

Values of a as a Function of C

| a (cm) | C (bits/sec/Hz) |
|---|---|
| 4.5 | 415.49 |
| 5.5 | 466.09 |
| 6.5 | 510.68 |
| 7.5 | 548.26 |
| 8.5 | 540.73 |
| 9.5 | 536.40 |

From Table 1, it can be seen that the greatest value of C occurs when $\alpha$=7.5 cm, and, therefore, the antennas described above should be fabricated with $\alpha$=7.5 cm. Furthermore, it should noted that the capacity decreases more rapidly when $\alpha$ becomes less than 7.5 cm as opposed to the decrease of C when $\alpha$ is greater than 7.5 cm. This effect becomes more pronounced when the number of antenna elements increases.

III. The Second Example

The second example is less idealized than the first and is chosen to demonstrate another facet of the illustrative embodiment. The second example involves the design of two array antennas that each comprise 50 (i.e., $n_T$=$n_R$=50) point antennas in a line, which transmit and receive omnidirectionally. One portion of the environment is uniformly and isotropically diffusive but the other is free space and the boundary between the free space and the diffusive portion is the z=0 plane. The transmitting antenna is well above the z=0 plane and the receiving antenna is well below the z=0 plane. The wavelength of the signal of interest is $\lambda$=15 cm, and the diffusive portion of the environment has a mean free path that is much larger than $\lambda$. The signal to noise ratio, $\rho$, is 100. Furthermore, the environment is assumed to have no losses due to absorption, no parasitic affects of the antennas are considered, and there is no mutual coupling between the antenna elements. The distance between the transmitter antenna elements is 9 cm. and the distance between the receiving antenna elements is 7.5 cm. The transmitter correlation matrix, M, is constrained and the transmitting power is evenly distributed among all of the transmitter antenna elements. The only parameter that can be varied in this example is the angle, $\theta$, between the line of transmitting antennas and the plane z=0.

Equations (2) and (3) & (4) are used to compute the covariance. In this example, $w^T(\hat{k},\hat{e})$ does not depend on $\hat{e}$ because we have point antennas and signal is transmitted with both polarizations. It equals $$w^T(\hat{k},\hat{e})=-2\hat{k}\cdot\hat{z}\Theta(-\hat{k}\cdot\hat{z})$$

where $\hat{z}$ is the unit vector pointing in upward z-direction $w^R(\hat{k},\hat{e})$ does not depend on $\hat{e}$ because we have point antennas and signal is received with both polarizations and does not depend on $\hat{k}$ because the receiving antenna is deep within the diffusive environment. Therefore, $w^R(\hat{k},\hat{e})=1$ for all $\hat{k}$ and $\hat{e}$.

$$\chi_i^T(\hat{k}) = e^{I\frac{2\pi}{\lambda}\hat{k}\cdot r_i} \text{ and } \chi_i^R(\hat{k}) = e^{I\frac{2\pi}{\lambda}\hat{k}\cdot r_i},$$

where $\hat{k}$ is the direction of the incoming wave $\vec{r}$ is the position of the ith antenna element with respect to the first antenna element, and $I=\sqrt{-1}$.

Computing C for several values of $\theta$ yields the data in Table 2.

TABLE 2

Values of a as a Function of C

| $\theta/\pi$ | C (bits/sec/Hz) |
|---|---|
| 0.0 | 274 |
| 0.1 | 273 |
| 0.2 | 266 |
| 0.3 | 248 |
| 0.4 | 221 |
| 0.5 | 199 |

From Table 2, it can be seen that the greatest value of C occurs when $\theta$=0, and, therefore, the antennas described above should be fabricated and deployed with $\theta$=0.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:

describing an environment;

describing a candidate antenna;

determining a performance characteristic based on said candidate antenna with respect to said environment wherein said performance characteristic is based on $T(\hat{k})$, $R(\hat{k})$ and $S(\hat{k},\hat{k}')$, wherein $T(\hat{k})$ is an $n_T$ by $n_T$ matrix, in which the matrix element $T_{ij}(\hat{k})$ is the correlation of a first signal transmitted from an transmitting antenna element i in direction $\hat{k}$ with respect to said first signal transmitted from an transmitting antenna element j in direction $\hat{k}$; $S(\hat{k},\hat{k}')$ is the power received at a receiving antenna from direction $\hat{k}'$ that is transmitted by a transmitting antenna in direction $\hat{k}$; $R(\hat{k}')$ is an $n_R$ by $n_R$ matrix, in which the the matrix element $R_{\alpha\beta}(\hat{k}')$ is the correlation of a second signal received from an receiving antenna element $\alpha$ from direction $\hat{k}'$ with respect to said second signal received from an receiving antenna element $\beta$ from direction $\hat{k}'$; and fabricating a first antenna in accordance with said candidate antenna.

2. The method of claim 1 wherein said environment is at least partially diffusive.

3. The method of claim 1 wherein said first antenna is a transmitting antenna and further comprising determining a transmitting power correlation matrix, M, for said first antenna.

4. The method of claim 3 further comprising operating said first antenna in accordance with said transmitting power correlation matrix, M.

5. The method of claim 1 wherein said performance characteristic is based on the channel capacity, C.

6. The method of claim 1 wherein said performance characteristic is based on a covariance, K.

7. A method comprising:

describing an environment;

describing a candidate transmitting antenna and a candidate receiving antenna; and determining a performance characteristic based on said candidate transmitting antenna and said candidate receiving antenna with respect to said environment wherein said performance characteristic is based on $T(\hat{k})$, $R(\hat{k})$ and $S(\hat{k},\hat{k}')$, wherein $T(\hat{k})$ is an $n_T$ by $n_T$ matrix, in which the matrix element $T_{ij}(\hat{k})$ is the correlation of a first signal transmitted from an transmitting antenna element i in direction $\hat{k}$ with respect to said first signal transmitted from an transmitting antenna element j in direction $\hat{k}$; $S(\hat{k},\hat{k}')$ is the power received at a receiving antenna from direction $\hat{k}'$ that is transmitted by a transmitting antenna in direction $\hat{k}$; $R(\hat{k}')$ is an $n_R$ by $n_R$ matrix, in which the the matrix element $R_{\alpha\beta}(\hat{k}')$ is the correlation of a second signal received from an receiving antenna element $\alpha$ from direction $\hat{k}'$ with respect to said second signal received from an receiving antenna element $\beta$ from direction $\hat{k}'$.

8. The method of claim 7 further comprising: fabricating a first antenna in accordance with said candidate transmitting antenna; and fabricating a second antenna in accordance with said candidate receiving antenna.

9. The method of claim 7 wherein said environment is at least partially diffusive.

10. The method of claim 7 further comprising determining a transmitting power correlation matrix, M, for said candidate transmitting antenna.

11. The method of claim 10 further comprising operating said first antenna in accordance with said transmitting power correlation matrix, M.

12. The method of claim 7 wherein said performance characteristic is based on the channel capacity, C.

13. A method comprising:

describing a candidate transmitting antenna and a candidate receiving antenna;

determining a performance characteristic based on an environment, said candidate transmitting antenna and said candidate receiving antenna wherein said performance characteristic is based on $T(\hat{k})$, $R(\hat{k})$ and $S(\hat{k},\hat{k}')$, wherein $T(\hat{k})$ is an $n_T$ by $n_T$ matrix, in which the matrix element $T_{ij}(\hat{k})$ is the correlation of a first signal transmitted from an transmitting antenna element i in direction $\hat{k}$ with respect to said first signal transmitted from an transmitting antenna element j in direction $\hat{k}$; $S(\hat{k},\hat{k}')$ is the power received at a receiving antenna from direction $\hat{k}'$ that is transmitted by a transmitting antenna in direction $\hat{k}$; $R(\hat{k}')$ is an $n_R$ by $n_R$ matrix, in which the the matrix element $R_{\alpha\beta}(\hat{k}')$ is the correlation of a second signal received from an receiving antenna element $\alpha$ from direction $\hat{k}'$ with respect to said second signal received from an receiving antenna element $\beta$ from direction $\hat{k}'$; and fabricating a first antenna in accordance with said candidate transmitting antenna.

14. The method of claim 13 wherein said environment is at least partially diffusive.

15. The method of claim 13 further wherein the steps of describing and determining are performed iteratively until said performance characteristic is satisfactory.

16. The method of claim 13 further comprising determining a transmitting power correlation matrix, M, for said candidate transmitting antenna.

17. The method of claim 16 further comprising operating said first antenna in accordance with said transmitting power correlation matrix, M.

18. The method of claim 13 wherein said performance characteristic is based on a statistical property of a signal between said candidate transmitting antenna and said candidate receiving antenna.

* * * * *